United States Patent
Hayes et al.

(10) Patent No.: US 10,357,997 B1
(45) Date of Patent: Jul. 23, 2019

(54) DRIVE AXLE ASSEMBLY WITH MOVEABLE AXLE SHAFT AND METHOD OF OPERATION

(71) Applicant: ArvinMeritor Technology, LLC, Troy, MI (US)

(72) Inventors: Brian D. Hayes, Newark, OH (US); Robert Martin, Neward, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 15/899,733

(22) Filed: Feb. 20, 2018

(51) Int. Cl.
| | |
|---|---|
| *B60K 23/08* | (2006.01) |
| *B60B 35/12* | (2006.01) |
| *B60K 17/16* | (2006.01) |
| *B60K 23/04* | (2006.01) |
| *B60K 17/36* | (2006.01) |

(52) U.S. Cl.
CPC ............ *B60B 35/121* (2013.01); *B60K 17/16* (2013.01); *B60K 17/36* (2013.01); *B60K 23/04* (2013.01); *B60K 23/0808* (2013.01); *B60K 2023/046* (2013.01); *B60K 2023/0841* (2013.01); *B60Y 2410/10* (2013.01)

(58) Field of Classification Search
None
See application file for complete search history.

(56) References Cited

U.S. PATENT DOCUMENTS

| | | | | |
|---|---|---|---|---|
| 3,706,350 | A | * | 12/1972 | Bokovoy ............... B60K 17/36 180/24.09 |
| 4,271,722 | A | * | 6/1981 | Campbell ............. B60K 17/16 180/247 |
| 5,996,720 | A | * | 12/1999 | Hunt ...................... B60K 23/08 180/247 |
| 7,211,017 | B2 | | 5/2007 | Green et al. |
| 7,291,083 | B2 | | 11/2007 | Almaguer |
| 8,313,407 | B2 | * | 11/2012 | Ekonen .............. B60K 23/0808 180/245 |
| 8,651,994 | B2 | | 2/2014 | Bassi et al. |
| 2003/0019672 | A1 | | 1/2003 | Borgen et al. |
| 2010/0041506 | A1 | * | 2/2010 | Cooper ................... F16H 48/08 475/223 |
| 2016/0369879 | A1 | | 12/2016 | Martin |
| 2016/0377168 | A1 | * | 12/2016 | Nahrwold ............... F16H 48/08 475/160 |
| 2017/0101000 | A1 | * | 4/2017 | Swales ..................... B60K 1/00 |

FOREIGN PATENT DOCUMENTS

| | | |
|---|---|---|
| EP | 2902239 A1 | 8/2015 |
| EP | 3171048 A1 | 5/2017 |

OTHER PUBLICATIONS

European Patent Office, Extended European Search Report for European Application No. 18212211.9-1012, dated May 28, 2019.

\* cited by examiner

*Primary Examiner* — Justin Holmes (74) *Attorney, Agent, or Firm* — Brooks Kushman P.C.

(57) ABSTRACT

A drive axle assembly includes a differential assembly, a wheel hub assembly, an axle shaft, and an actuator mechanism. The actuator mechanism is adapted to move the axle shaft between a first axial position in which the axle shaft is engaged with the wheel hub assembly, and a second axial position in which the axle shaft is disengaged from the wheel hub assembly.

20 Claims, 10 Drawing Sheets

DRIVE AXLE ASSEMBLY WITH MOVEABLE AXLE SHAFT AND METHOD OF OPERATION

TECHNICAL FIELD

This disclosure relates to a drive axle assembly for a vehicle, and more particularly, to a drive axle assembly having a moveable axle shaft.

BACKGROUND

A drive axle assembly is disclosed in U.S. Pat. No. 8,651,994.

SUMMARY

In at least one approach, a drive axle assembly is provided. The drive axle assembly may include a differential assembly having a side gear, a wheel hub assembly having a hub and a cap, and an axle shaft. The axle shaft may be rotatable about an axis and may extend axially from the differential assembly toward the cap such that the axle shaft is received in the hub. The axle shaft may be moveable along the axis relative to the side gear and the cap. The drive axle assembly may further include an actuator mechanism that may actuate the axle shaft along the axis between a first axial position in which the differential assembly provides torque to the wheel hub assembly and a second axial position in which the wheel hub assembly is disconnected from the differential assembly such that the differential assembly does not provide torque to the wheel hub assembly.

In at least one approach, a drive axle assembly is provided. The drive axle assembly may include a differential assembly having a side gear, and a wheel hub assembly having a cap that defines a first clutch interface. The drive axle assembly may further include an axle shaft that is rotatable about an axis and that may extend axially between the differential assembly and the wheel hub assembly. The axle shaft may be moveable along the axis relative to the side gear and may include a second clutch interface at a distal end. The drive axle assembly may further include an actuator mechanism that may have a clutch collar that is secured to the axle shaft. The clutch collar may move the axle shaft between a first axial position in which the second clutch interface is engaged with the first clutch interface, and a second axial position in which the second clutch interface is disengaged from the first clutch interface.

In at least one approach, a method for operating a drive axle assembly is provided. The method may include providing a differential assembly, a wheel hub assembly having a hub, and an axle shaft that may be rotatable about an axis and that may extend axially from a differential assembly and is received in the hub. The method may further include actuating the axle shaft along the axis between a first axial position between in which the differential assembly provides torque to the wheel hub assembly and a second axial position in which the wheel hub assembly is disconnected from the differential assembly such that the differential assembly does not provide torque to the wheel hub assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
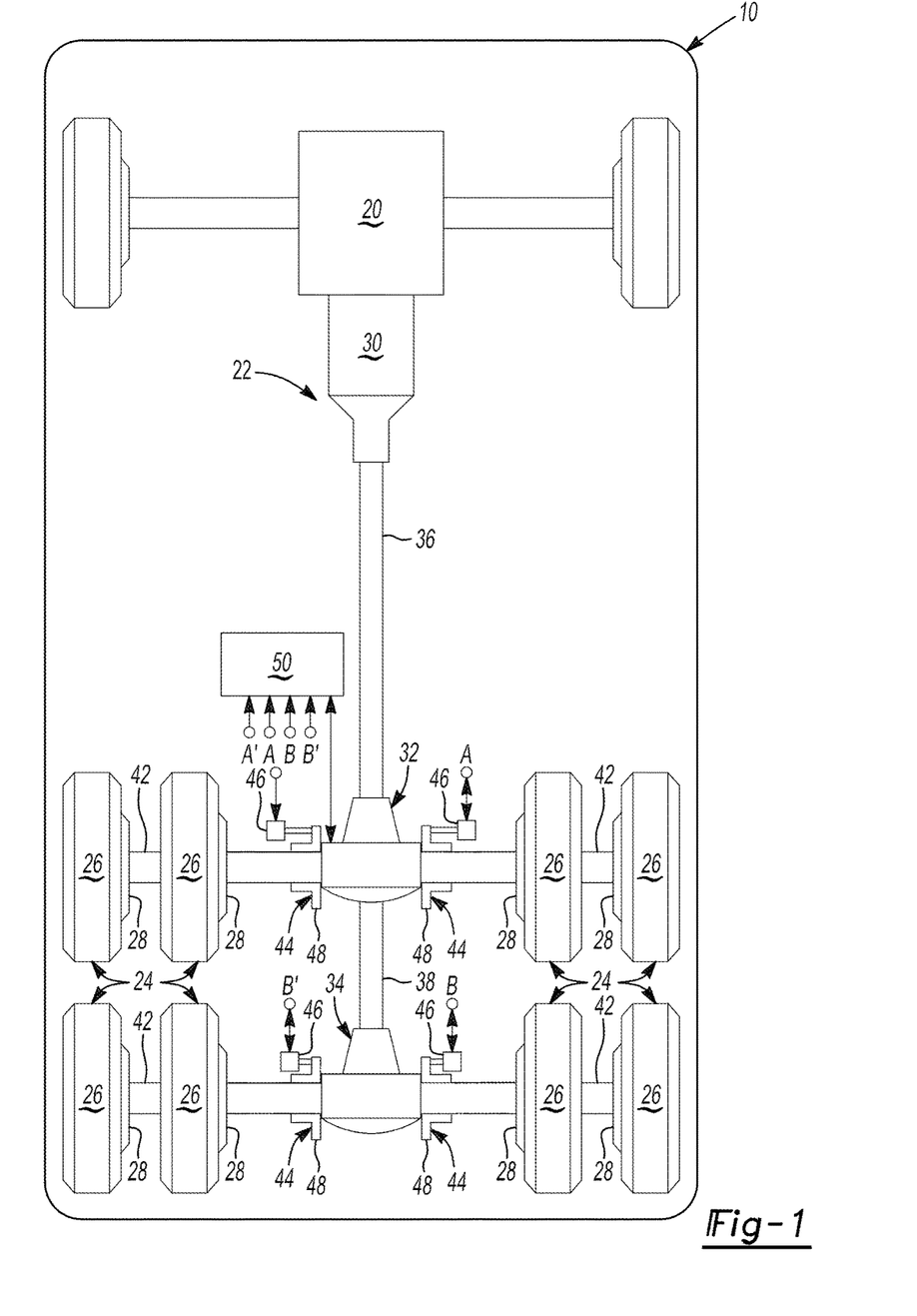
FIG. 1 is a schematic of an exemplary vehicle having an axle assembly.

Referring to FIG. 1, an exemplary vehicle 10 is shown. The vehicle 10 may be of any suitable type, such as a motor vehicle like a truck, bus, farm equipment, military transport or weaponry vehicle, or cargo loading equipment for land, air, or marine vessels. The vehicle 10 may include one or more power sources 20 and a drivetrain 22.

The power source 20 may provide power that may be used to rotate one or more traction wheels. In FIG. 1, a single power source 20 is shown that may be configured as an internal combustion engine that may be adapted to combust any suitable type of fuel, such as gasoline, diesel fuel, or hydrogen. Alternatively, multiple or different power sources may be provided, such as may be employed with a hybrid vehicle or electric vehicle. In such approaches, a power source could be an electric power source, such as a battery, capacitor, or fuel cell, or a non-electric power source, such as a hydraulic power source.

The drivetrain 22 may be driven or powered by one or more power sources 20 and may provide torque to one or more traction wheel assemblies 24 that may include a tire 26 mounted on a wheel 28. The drivetrain 22 may include a transmission 30 and one or more axle assemblies. In the approach shown, a tandem axle configuration is shown that includes a first axle assembly 32 and a second axle assembly 34. The first axle assembly 32 may be referred to as a forward-rear axle assembly. The second axle assembly 34 may be referred to as a rear-rear axle assembly. Optionally, additional axle assemblies may be provided that may be coupled together in series. The power source 20 may be coupled to the input of the transmission 30. An output of the transmission 30 may be coupled to an input of the first axle assembly 32, such as with a drive shaft 36. An output of the first axle assembly 32 may be coupled to an input of the second axle assembly 34 via a prop shaft 38.

The first and second axle assemblies 32, 34 may each have a plurality of outputs that may be coupled to one or more axle shafts 42. Axle shafts 42 may be selectively coupled to corresponding wheel assemblies 24, as discussed in greater detail elsewhere herein. An axle shaft disconnect unit 44 may be provided to couple or decouple an axle shaft 42 with a wheel assembly 24. In at least one exemplary approach, the axle shaft disconnect unit 44 may include an actuator 46 that may be configured to actuate or move an axle shaft 42 between a first axial position and a second axial position. In the first position, the axle shaft 42 may be coupled to a wheel assembly 24 to permit torque to be transferred from the axle assembly 32, 34 to the wheel assembly 24. In the second axial position, the axle shaft 42 may be disconnected or not coupled to the wheel assembly 24. As such, torque is not transferred from the axle assembly 32, 34 to a wheel assembly 24. In at least one approach, an individual axle assembly (e.g., axle assembly 32 or axle assembly 34) may be provided with two axle shaft disconnect units 44. In still another approach, an individual axle assembly (e.g., axle assembly 32 or axle assembly 34) may be provided with one axle shaft disconnect unit 44.

The vehicle 10 may also include a control system 50 that may monitor and control operation of various vehicle systems and components, such as the first axle assembly 32 and the axle shaft disconnect units 44. For example, the control system 50 may communicate with and control the axle shaft disconnect units 44 associated with the first and second axle assemblies 32, 34 as represented by connection nodes A and A' and nodes B and B', respectively. If an axle shaft disconnect unit 44 is not provided with a particular axle assembly 32, 34, the corresponding connection nodes may be omitted.

Figure 2:
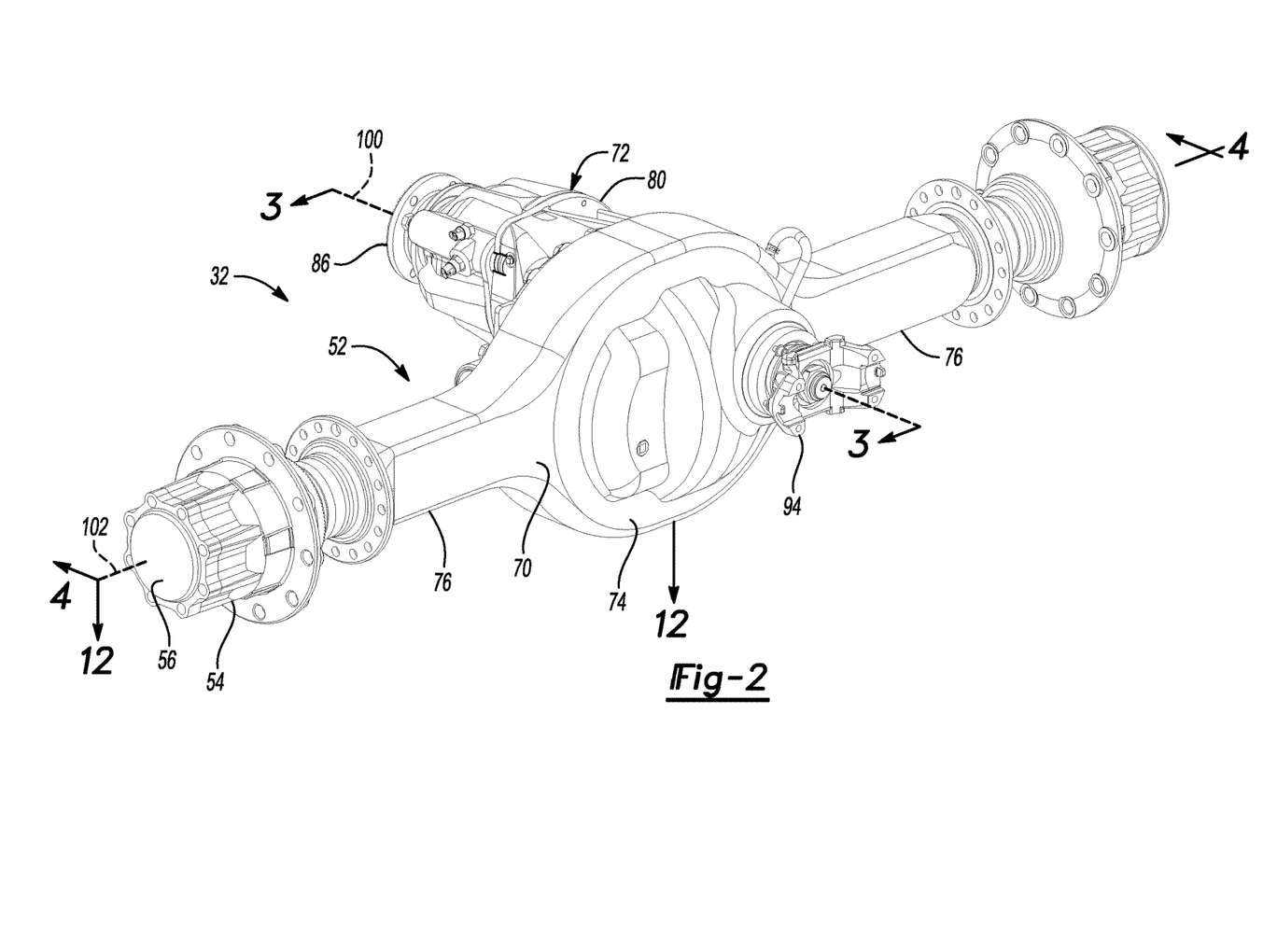
FIG. 2 a perspective view of a drive axle assembly.
Figure 3:
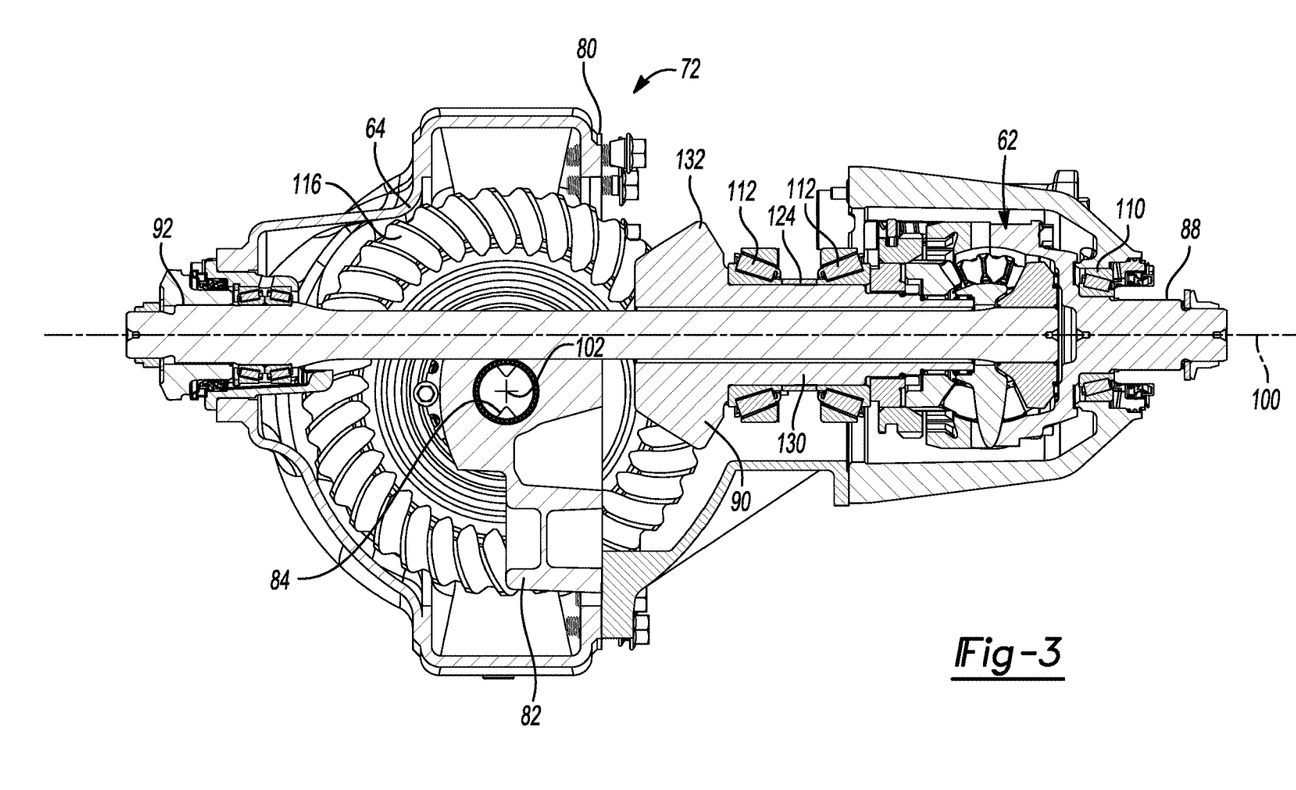
FIG. 3 is a section view of the drive axle assembly along section line 3-3.

Referring to FIGS. 2 and 3, an example of a first axle assembly 32 (referred to hereinafter as axle assembly 32) is shown. The axle assembly 32 may include a housing assembly 52 and a wheel hub assembly that includes a wheel hub 54 and a cap 56. The wheel hub 54 may be adapted to retain and support a tire (e.g., tire 26 of FIG. 1). In at least one approach, the cap 56 is a discrete component secured to the wheel hub 54 (e.g., through one or more fasteners). In at least another approach, the wheel hub 54 and the cap 56 formed as a single component.

The housing assembly 52 may further include an interaxle differential assembly 62, a differential assembly 64, and at least one axle shaft 66. The axle shaft 66 may define a shaft body 68 extending between opposing ends of the axle shaft 66 (e.g., between a proximal end disposed proximal the differential assembly 64 and a distal end proximal the wheel hub 54).

The housing assembly 52 may receive various components of the axle assembly 32. In addition, the housing assembly 52 may facilitate mounting of the axle assembly 32 to the vehicle. The housing assembly 52 may include an axle housing 70 and a differential carrier 72.

The axle housing 70 may receive and support the axle shafts 66. In at least one approach, the axle housing 70 may include a center portion 74 and at least one arm portion 76.

The center portion 74 may be disposed proximate the center of the axle housing 70. The center portion 74 may define a cavity that may receive the differential assembly 64. A lower region of the center portion 74 may at least partially define a sump portion that may contain lubricant. Splashed lubricant may flow down the sides of the center portion 74 and may flow over internal components of the axle assembly 32 and gather in the sump portion.

The center portion 74 may include a carrier mounting surface. The carrier mounting surface may face toward and may engage the differential carrier 72. The carrier mounting surface may facilitate mounting of the differential carrier 72 to the axle housing 70. For example, the carrier mounting surface may have a set of holes that may be aligned with corresponding holes on the differential carrier 72. Each hole may receive a fastener, such as a bolt, that may couple the differential carrier 72 to the axle housing 70.

One or more arm portions 76 may extend from the center portion 74. For example, two arm portions 76 may extend in opposite directions from the center portion 74 and away from the differential assembly 64. The arm portions 76 may have substantially similar configurations. For example, the arm portions 76 may each have a hollow configuration or tubular configuration that may extend around the corresponding axle shaft 66 and may help separate or isolate the axle shaft 66 from the surrounding environment. An arm portion 76 or a portion thereof may be integrally formed with the center portion 74. Alternatively, an arm portion 76 may be separate from the center portion 74. In such a configuration, each arm portion 76 may be attached to the center portion 74 in any suitable manner, such as by welding or with one or more fasteners. Each arm portion 76 may define an arm cavity that may receive a corresponding axle shaft 66.

Referring to FIGS. 2 and 3, the differential carrier 72, which may also be called a carrier housing, may be mounted to the center portion 74 of the axle housing 70. The differential carrier 72 may receive the interaxle differential assembly 62 and may support components of the differential assembly 64. The differential carrier 72 may be configured as a single component or as multiple components that are assembled to each other. For instance, the differential carrier may include a first portion that is mounted to the axle housing 70 and a second portion that is mounted to the first portion that may receive the interaxle differential assembly 62. The differential carrier 72 may have a flange portion 80.

Referring to FIGS. 2 and 3, the flange portion 80 may facilitate mounting of the differential carrier 72 to the axle housing 70. For example, the flange portion 80 may be disposed on the carrier mounting surface of the axle housing 70 and may have a set of holes that may receive fasteners as previously discussed.

Referring to FIG. 3, the bearing support 82 may receive a roller bearing assembly 84 that may rotatably support the differential assembly 64. For example, two bearing supports 82 may be received in the center portion 74 and may be located proximate opposite sides of the differential assembly 64. The bearing support 82 may be provided in various configurations. For example, a bearing support 82 may include a pair of legs that extend from the differential carrier 72. A bearing cap may be mounted to the legs and may arch over a roller bearing assembly 84. In such a configuration, the bearing support 82 and bearing cap may cooperate to extend around, receive, and secure the roller bearing assembly 84. As another example, the bearing support 82 may be received in a roller bearing assembly 84 which in turn may support the differential assembly 64.

Additional components that may be associated with the differential assembly 64 may include an input yoke 86, an input shaft 88, a drive pinion 90, an output shaft 92, and an output yoke 94.

Referring to FIG. 2, the input yoke 86 may facilitate coupling of the axle assembly 32 to a torque source. For example, the input yoke 86 may be coupled to the drive shaft. The input yoke 86 may be disposed on the input shaft 88, the input shaft 88 being best shown in FIG. 3. For example, the input yoke 86 may have an opening that receives the input shaft 88 and may be secured to the input shaft 88 with a nut.

Referring to FIGS. 2 and 3, the input shaft 88 may extend along and may be configured to rotate about a first axis 100. For example, the input shaft 88 may be rotatably supported by one or more roller bearing assemblies 110 that may be disposed on the differential carrier 72. The input shaft 88 may be part of the interaxle differential assembly 62 or may be operatively connected to the interaxle differential assembly 62. For instance, the input shaft 88 may be integrally formed with a case of the interaxle differential assembly 62 or may be provided as a separate component that is fixedly coupled to the case in one or more approaches.

Referring to FIG. 3, the drive pinion 90 may provide torque to a ring gear 116 that may be provided with the differential assembly 64. The drive pinion 90 may extend along and may be configured to rotate about a first axis 100. The ring gear 116 may rotate about a second axis 102. The drive pinion 90 may be coaxially disposed with the input shaft 88 and may be spaced apart from the input shaft 88. The drive pinion 90 may be rotatably supported by one or more roller bearing assemblies 112 that may be disposed on the differential carrier 72. In FIG. 3, two roller bearing assemblies 112 are shown that are spaced apart from each other and separated by a spacer ring 118 that may extend around the drive pinion 90. In at least one approach, the drive pinion 90 may include a shaft portion 130 and a gear portion 132. The shaft portion 130 may extend from the interaxle differential assembly 62 to the gear portion 132.

The gear portion 132 may be disposed at an end of the shaft portion 130. The gear portion 132 may have a plurality of teeth that may mate with corresponding teeth on the ring gear 116. The gear portion 132 may be integrally formed with the shaft portion 130 or may be provided as a separate component that may be fixedly disposed on the shaft portion 130 in one or more embodiments.

Referring to FIGS. 2 and 3, the output shaft 92 may extend along and may be configured to rotate about the first axis 100. For instance, the output shaft 92 may be supported by one or more roller bearings that may be disposed on the housing assembly 52. The output shaft 92 may extend through the drive pinion 90. In addition, the output shaft 92 may extend through a spider of the interaxle differential assembly 62. The output shaft 92 may be coupled to the interaxle differential assembly 62 at a first end. For example, the output shaft 92 may be fixedly coupled to a second side gear of the interaxle differential assembly 62. The output shaft 92 may be fixedly coupled to the output yoke 94 at a second end that may be disposed opposite the first end.

Referring to FIG. 2, the output yoke 94 may facilitate coupling of the output shaft 92 to a second axle assembly that may be disposed in series with the axle assembly 32. For instance, the output yoke 94 may be coupled to a connecting shaft, such as a prop shaft, which in turn may be operatively connected to the second axle assembly.

Referring to FIG. 3, the interaxle differential assembly 62 may operatively connect the input shaft 88 to the drive pinion 90 and/or the output shaft 92. The interaxle differential assembly 62 may compensate for speed differences between different drive axle assemblies, such as speed differences between the axle assembly 32 and a second axle assembly.

Figure 4:
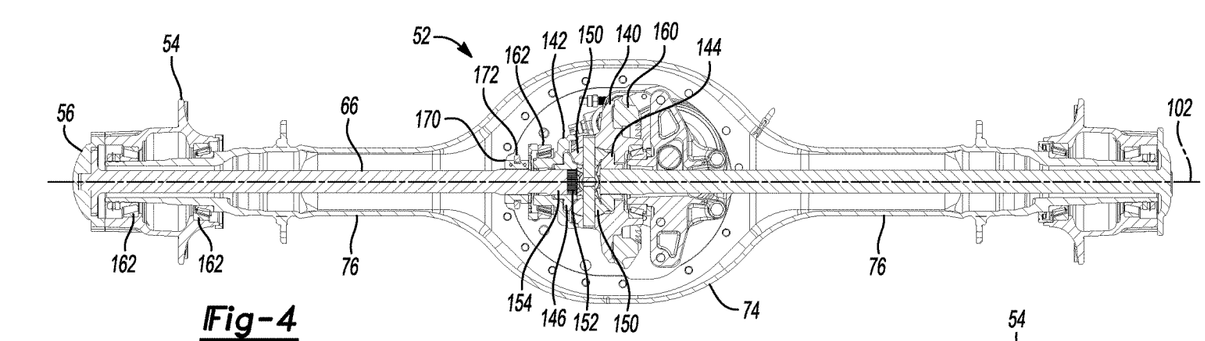
FIG. 4 is a section view of the drive axle assembly along section line 4-4.
Figure 5:
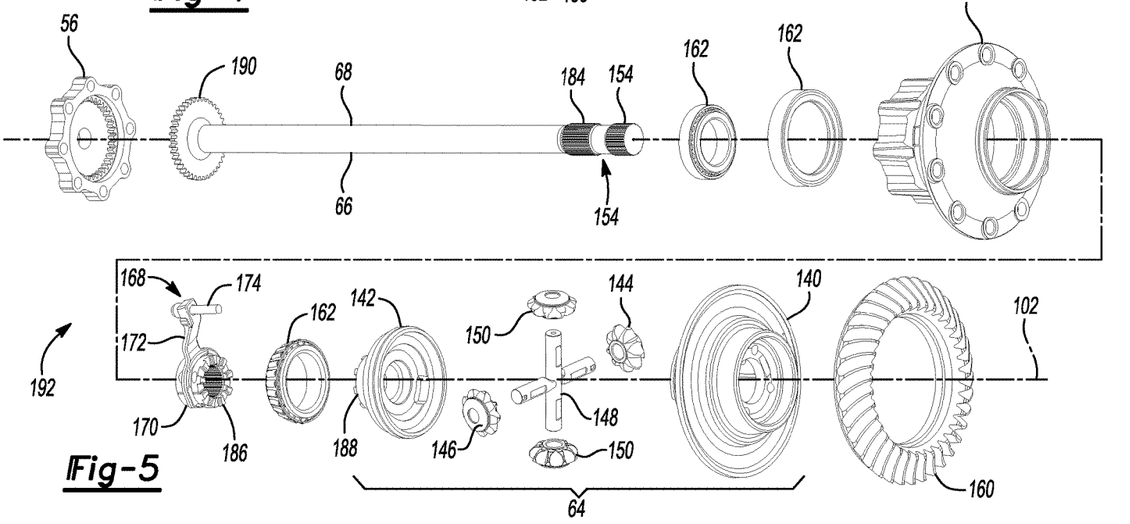
FIGS. 5 and 6 are exploded views of a portion of the drive axle assembly of FIGS. 2-4 with some components omitted for clarity.
Figure 6:
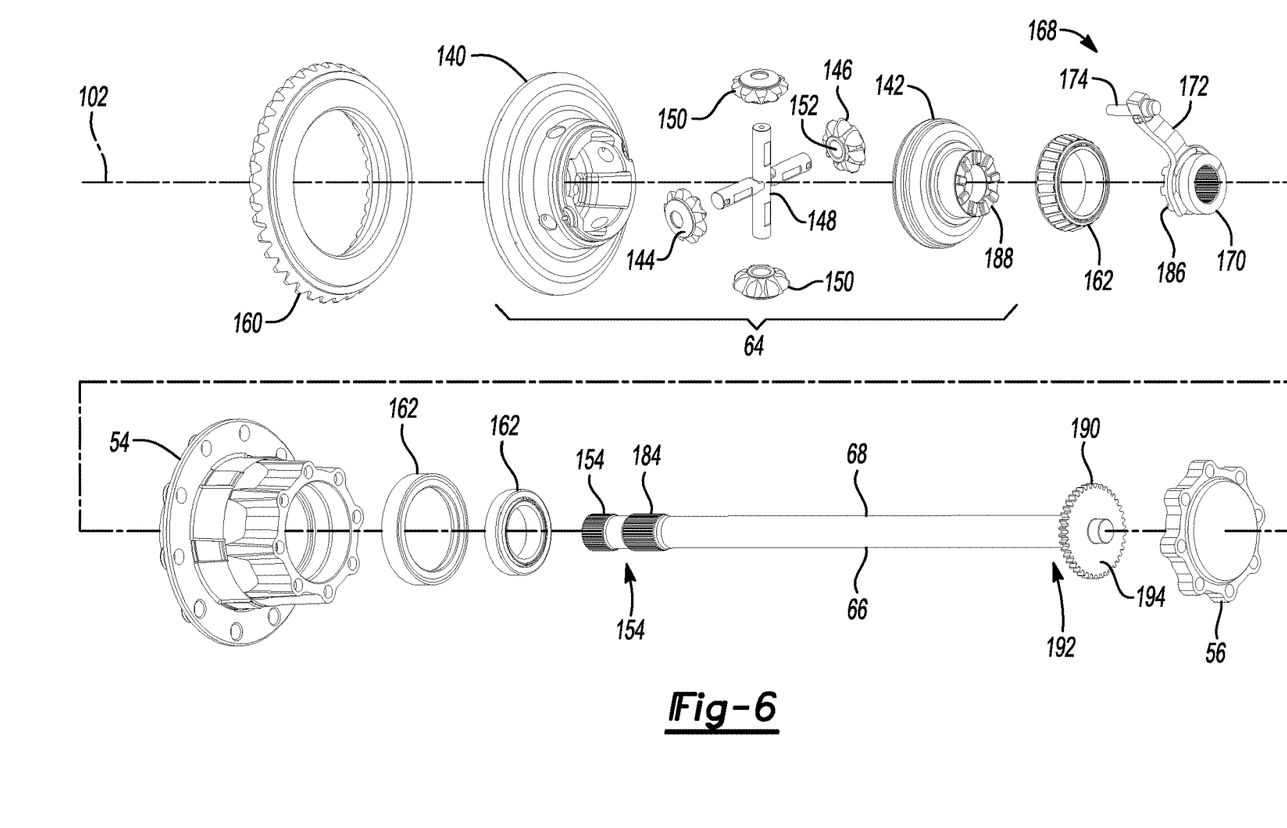

Referring to FIGS. 4-6, the axle shaft 66 may be rotatable about an axis such as the second axis 102. The axle shaft 66 may extends axially from the differential assembly 64 toward the cap 56 such that the axle shaft 66 may be received in the wheel hub 54. The axle shaft 66 may be moveable along the second axis 102 relative to a side gear (such as a second gear) and the cap 56.

The differential assembly 64 may include a case. In at least one approach, the differential assembly 64 may include a first case portion 140 and a second case portion 142. The first and second case portions 140, 142 may cooperate to at least partially define a cavity. The cavity may at least partially receive side gears such as a first gear 144 and a second gear 146, a spider 148, and at least one pinion gear 150. The first and second case portions 140, 142 may be configured to rotate about the axis 102.

The second gear 146 may include a bore 152 defining an internal spline. The axle shaft 66 may include a proximal end 154 that may be received in the bore 152. In at least one approach, the proximal end 154 may define an external spline that may be disposed in engagement with the internal spline of the bore 152 to rotationally fix the axle shaft 66 to the second gear 146. In this way, rotation of the second gear 146 may effect a corresponding rotation of the axle shaft 66; for example about the second axis 102.

A ring gear 160 may be fixedly mounted to first case portion 140 (for example, at a flange portion of the first case portion 140). The ring gear 160 may engage a pinion and receive torque from a pinion that may receive torque from a drivetrain component, such as an internal combustion engine, transmission, or transfer case. Torque provided to the pinion may be transmitted to the ring gear 160 and then to corresponding wheel end assemblies and traction wheels via the axles shafts 66. Alternatively, the ring gear may be omitted in various configurations, such as when the differential assembly is configured as an interaxle differential unit.

The housing assembly 52 may also house one or more bearings 162 (such as roller bearings) that may rotatably support one or more components within the housing assembly 52.

The housing assembly 52 may also house an actuator mechanism 168. The actuator mechanism 168 may include a clutch collar 170, a shift fork 172, and an actuator 174. The actuator 174 may be adapted to effect a movement of the shift fork 172, for example, along an axis that may be parallel to axis 102. The actuator 174 may be of any suitable type, such as a pneumatic, hydraulic, vacuum, mechanical, or electromechanical actuator. In at least one approach, the actuator 174 may include a piston, a fork mounting feature, and a biasing member.

Figures 7, 8:
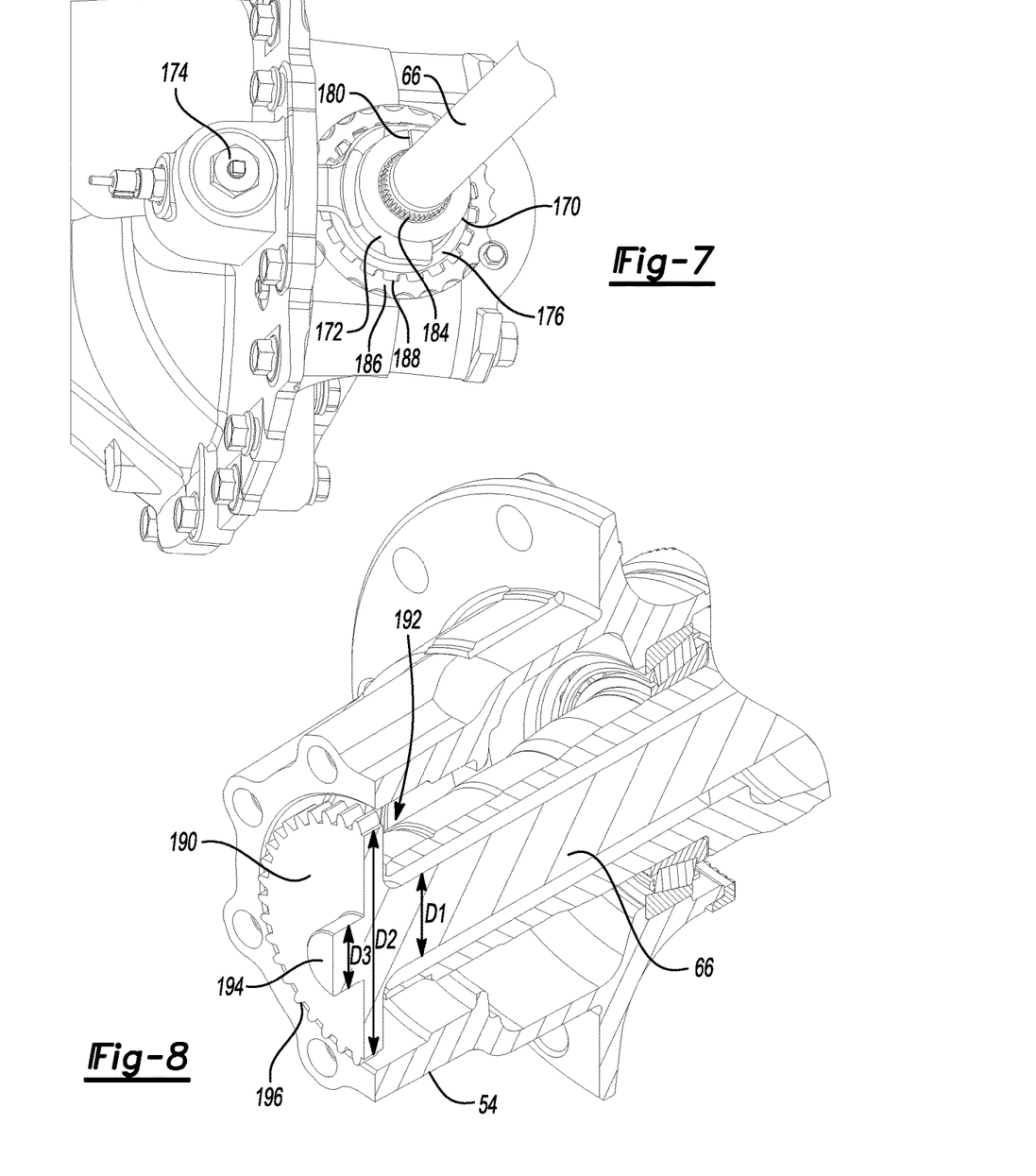
FIG. 7 is a perspective view of a clutch collar.
FIG. 8 is a perspective view of an axle shaft in at least one approach.

Referring to FIG. 7, the clutch collar 170 may define a clutch collar groove 176 for receiving the shift fork 172. In this way, movement of the shift fork 172 (e.g., due to actuation at the actuator 174 may effect a movement of the clutch collar 170, for example, along an axis that may be parallel to axis 102. The actuator 174 may move the clutch collar 170 between first and second end positions (and intermediate positions therebetween), as discussed in greater detail elsewhere herein.

The clutch collar 170 may be fixedly secured to the axle shaft 66. In at least one approach, the clutch collar 170 may be in the form of a clamp collar. More particularly, the clutch collar 170 may include a slot 180 and at least one access port for receiving one or more clamp screws 182. The clutch collar 170 may further include an internal spline. The clutch collar 170 may be disposed on a clamp region 184 of the axle shaft 66. The clamp region 184 may define an external spline that may be adapted to receive and engage the internal spline of the clutch collar 170. In this way, the clutch collar 170 may be rotationally fixed to the axle shaft 66.

The clamp screws 182 may be tightened such that a width of the slot 180 formed in clutch collar 170 may be decreased. In this way, the clutch collar 170 may exert a compressive force (e.g., a "crushing" force) on the axle shaft at the clamp region 184. The compressive force may be such that the clutch collar 170 may be fixedly secured to the axle shaft 66. More particularly, the compressive force may be such that an axial movement of the clutch collar 170 (e.g., as effected by the actuator 174 through the shift fork 172) may effect an axial movement of the axle shaft 66, for example, along axis 102.

The clutch collar 170 may further be provided with a first face spline arrangement 186. The first face spline arrangement 186 may be moveable into and out of engagement with a second face spline arrangement 188 on the second case portion 142. In this way, when the clutch collar 170 is disposed such that the first and second spline arrangements 186, 188 are disengaged, the differential assembly 64 may be in an unlocked configuration. In the unlocked configuration, torque may be transmitted to the axially aligned axles, but the axles and their associated wheel assemblies 24 may be permitted to rotate at different speeds. Such unlocking of the differential assembly 64 may aid in negotiating a turn and help avoid undesirable vehicle handling or tire wear.

When the clutch collar 170 is moved such that the first and second spline arrangements 186, 188 are engaged, the differential assembly 64 may be in a locked configuration. In the locked configuration, torque may be transmitted to both axially-aligned axles such that both axles and their associated wheel assemblies 24 rotate together at a common speed. Such locking of the differential assembly 64 may help increase traction.

Referring now to FIG. 8, the axle shaft 66 may have a clutch portion such as an axle flange 190 disposed at a distal end 192 of the axle shaft 66. In at least one approach, the axle flange 190 may be a generally disc-shaped clutch portion having an outer diameter D2 greater than the diameter D1 of an intermediate portion of the axle shaft 66.

The axles shaft 66 may further include a boss 194 at the distal end 192 of the axle shaft 66. The boss 194 may be, for example, a cylindrical boss, and may have an outer diameter D3 less than the diameter D1 of the intermediate portion of the axle shaft 66.

In at least one approach, and as shown in FIG. 8, an outer perimeter of the axle flange 190 may define a clutch interface. The clutch interface may have a set of teeth that may be arranged around the axis 102, such as an outer spline arrangement 196.

Figure 9:
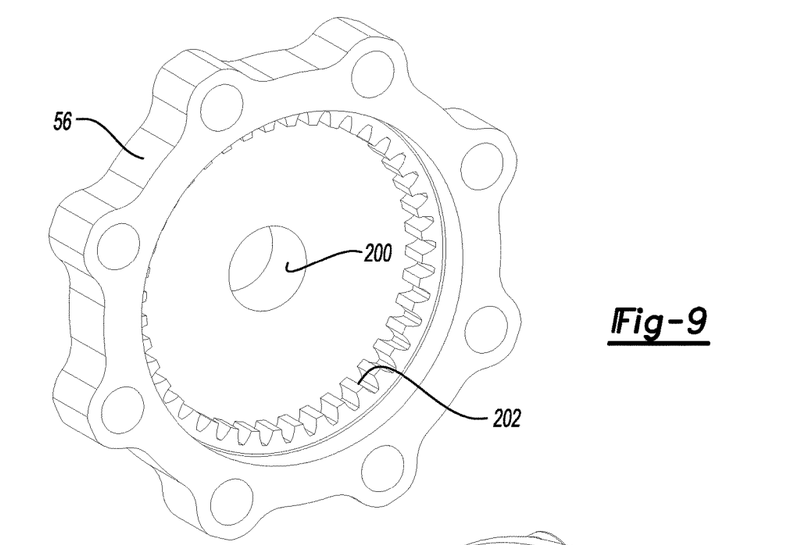
FIG. 9 is a perspective view of a hub flange in at least one approach.

Referring to FIG. 9, a cap 56 may be provided with a recess 200, for example, at a central region of the cap 56. The recess 200 may be sized to receive the boss 194 of the axle shaft 66. In this way, the recess 200 may support the boss 194 within the recess 200, and the combination thereof may collectively form an inner support arrangement. In at least one approach, the recess 200 may have a depth greater than an axial distance between the first and second positions of the clutch collar 170, as described in greater detail elsewhere herein.

The cap 56 may further be provided with a clutch interface. The clutch interface may have a set of teeth that may be arranged around the axis 102, such as an inner spline arrangement 202. The inner spline arrangement 202 may be adapted to interface with the outer spline arrangement 196 of the axle flange 190 of the axle shaft 66 to form a clutch engagement interface. In this way, in one configuration, the inner spline arrangement 202 and the outer spline arrangement 196 may mesh to rotatably lock the axle shaft 66 with the cap 56.

In at least one approach, the outer spline arrangement 196 and the inner spline arrangement 202 may define a negative pressure angle in their geometries. In this way, when the inner spline arrangement 202 is engaged with the outer spline arrangement 196, the axle shaft 66 may be drawn in the axial direction of the cap 56.

Figure 10:
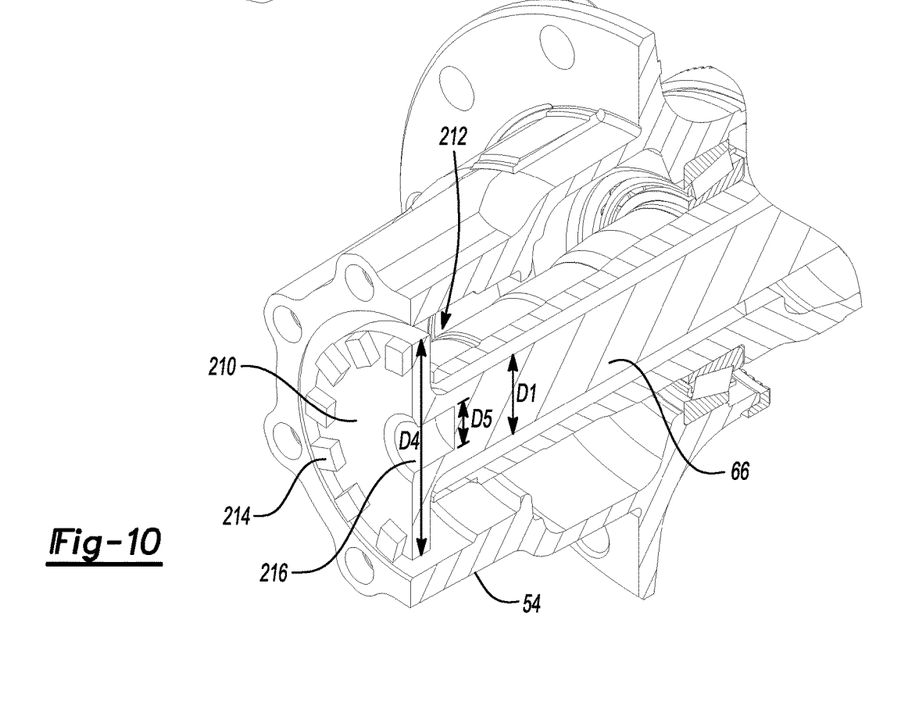
FIG. 10 is a perspective view of an axle shaft in at least another approach.
Figure 11:
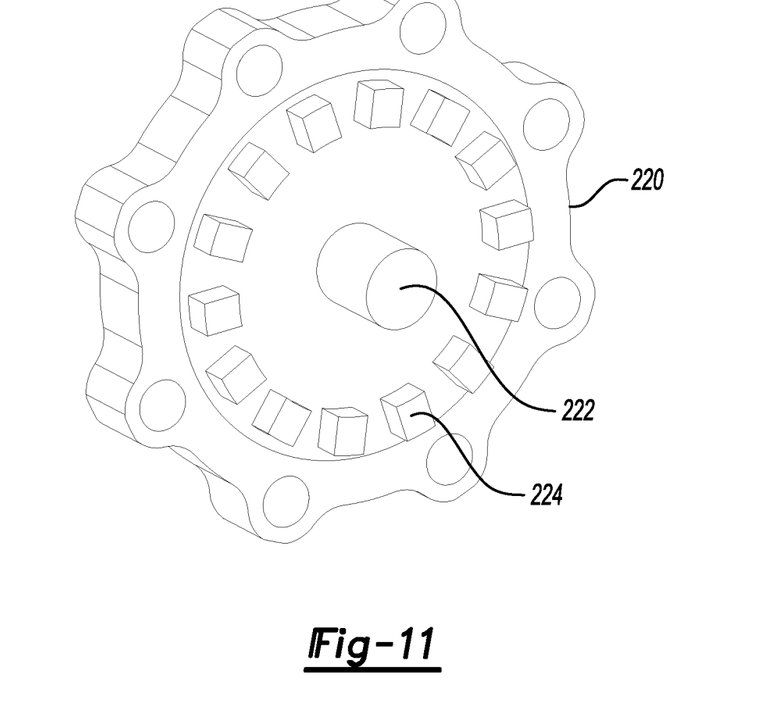
FIG. 11 is a perspective view of a hub flange in at least another approach.

Referring to FIGS. 10 and 11, an alternative axle shaft-cap is shown. The axle shaft 66 may have a clutch portion 210 disposed at a distal end 212 of the axle shaft 66. In at least one approach, the clutch portion 210 may be a generally disc-shaped clutch portion having an outer diameter D4 greater than the diameter D1 of the shaft body 68 of the axle shaft 66.

The axles shaft 66 may further include a recess 214 at the distal end 212 of the axle shaft 66. The recess 214 may be, for example, a cylindrical recess, and may have an inner diameter D5 less than the diameter D1 of the intermediate portion of the axle shaft 66.

In at least one approach, and as shown in FIG. 10, an outer perimeter of the clutch portion 210 may define a clutch interface such as a first face spline arrangement 216.

Referring to FIG. 11, a cap 220 may be provided with a boss 222, for example, at a central region of the cap 220. The boss 222 may be sized to be disposed within the recess 214 of the axle shaft 66. In this way, the recess 214 may support the boss 222 within the recess 214, and the combination thereof may collectively form an inner support arrangement.

The cap 220 may further be provided with a clutch interface such as a second face spline arrangement 224. The second face spline arrangement 224 may be adapted to interface with the first face spline arrangement 216 of the clutch portion 210 of the axle shaft 66 to form a clutch engagement interface. In this way, in one configuration, the first face spline arrangement 216 and the second face spline arrangement 224 may mesh to rotatably lock the axle shaft 66 with the cap 220.

It is expressly contemplated that any suitable combination inner support arrangement and clutch interface may be provided. For example, the inner support arrangement of FIGS. 8 and 9 (boss-recess) may be provided with the clutch interface of FIGS. 10 and 11 (opposing face spline arrangements). Similarly, the inner support arrangement of FIGS. 10 and 11 (boss-recess) may be provided with the clutch interface of FIGS. 8 and 9 (inner and outer spline arrangements).

Figure 12:
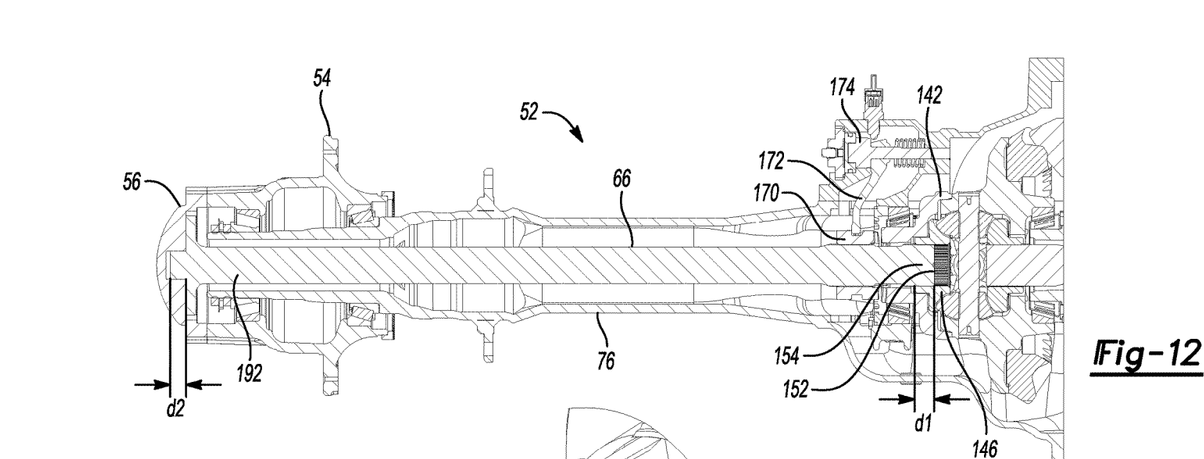
FIG. 12 is a section view of the drive axle assembly along section line 12-12 with the axle shaft in a first axial position.
Figure 13:
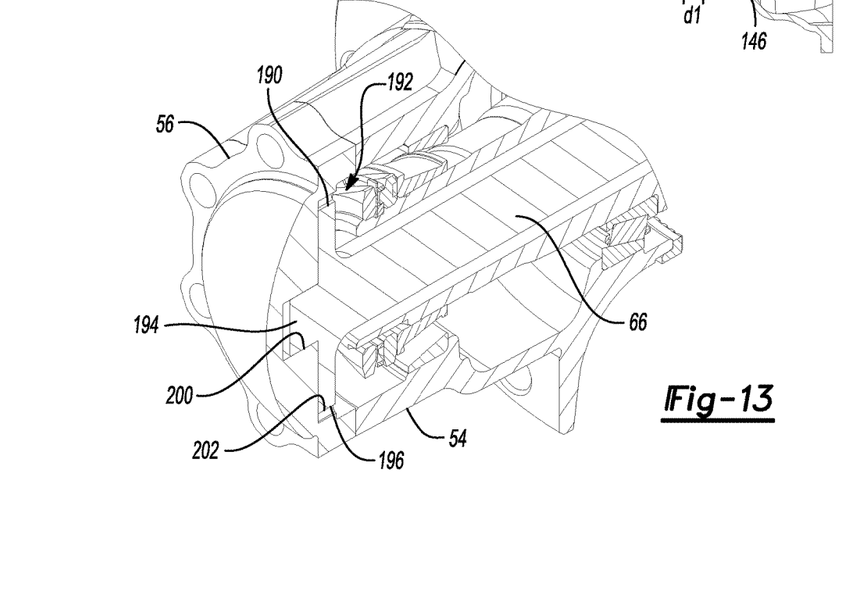
FIG. 13 is a perspective view of the axle shaft of FIG. 12.
Figures 14, 15:
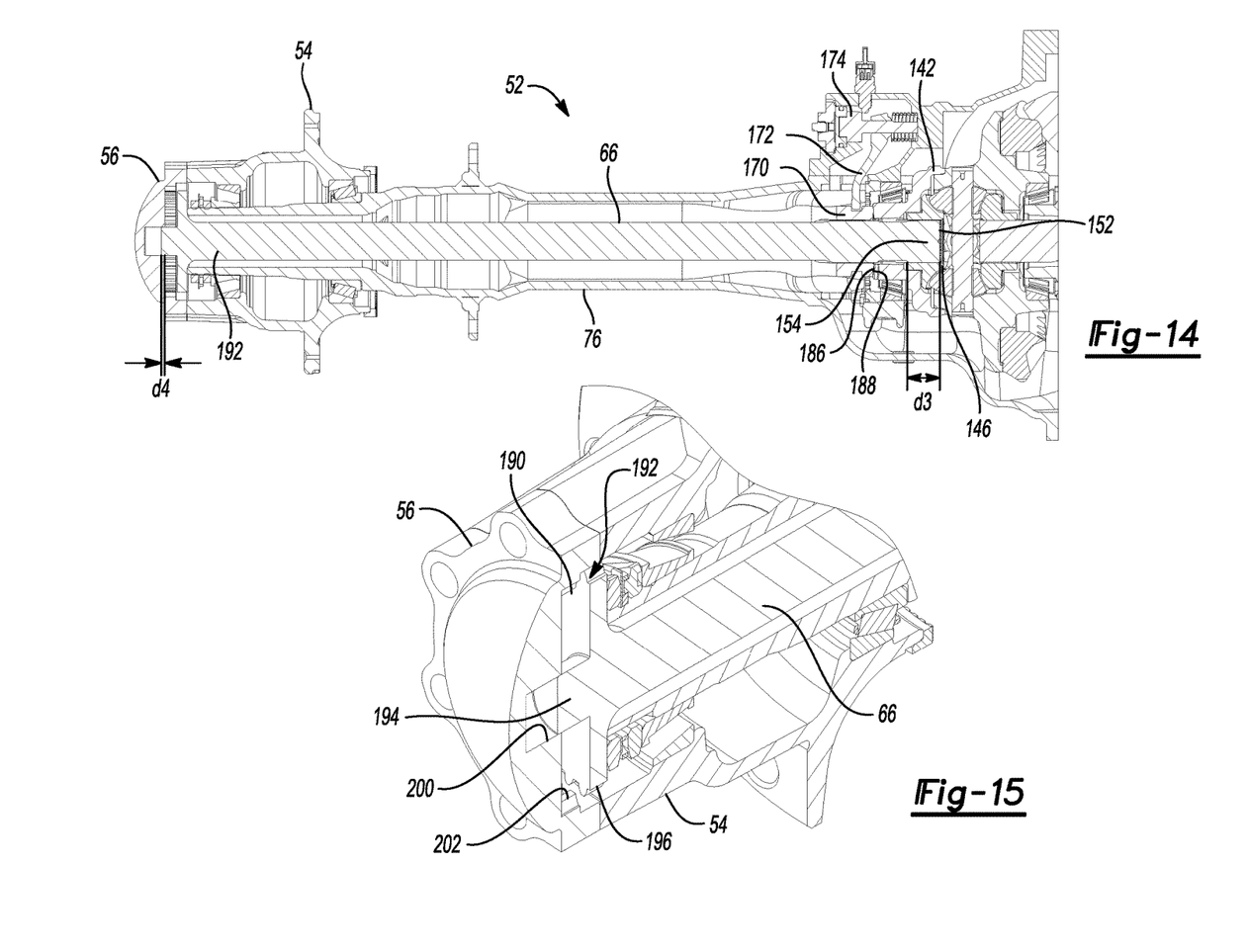
FIG. 14 is a section view of the drive axle assembly along section line 12-12 with the axle shaft in a second axial position.
FIG. 15 is a perspective view of the axle shaft of FIG. 14.

Referring to FIGS. 12-15, the clutch collar 170 may be moved between first and second axial positions. In this way, the axle shaft 66 may be moved between an engaged configuration when the clutch collar 170 is in the first position (as shown in FIGS. 12 and 13), and a disengaged configuration when the clutch collar 170 is in the second position (as shown in FIGS. 14 and 15). As used herein, an axial position of a component may refer to a datum point of the component. For example, an axial position of the axle shaft 66 may refer to a distal end point of the axle shaft 66, a center-most point of the axle shaft 66, a proximal end point of the axle shaft 66, or any other suitable point of the axle shaft 66.

Referring to FIGS. 12 and 13, in the engaged configuration, the actuator 174 may be in an "off" mode. The proximal end 154 of the axle shaft 66 may be received within the bore 152 of the second gear 146 at an axial depth d1. At the distal end 192 of the axle shaft 66, the outer spline arrangement 196 of the axle flange 190 may be disposed in meshed engagement with the inner spline arrangement 202 of the cap 56. Also when in the engaged configuration, the boss 194 may be received within the recess 200 at an axial depth d2.

In the engaged configuration, the second gear 146 may be adapted to transmit a torque to the axle shaft 66 through a spline arrangement. The axle shaft 66 may in turn transmit torque to the wheel hub 54 and cap 56 through the outer spline arrangement 196 and inner spline arrangement 202. In this way, a torque may be transmitted through the axle shaft 66 to a tire (e.g., tire 26 of FIG. 1).

Referring to FIGS. 14 and 15, in the disengaged configuration, the actuator 174 may be in an "on" or "actuated" mode. Actuation of the actuator 174 may effect an axial movement of the shift fork 172, which may effect a corresponding axial movement of the clutch collar 170, which may effect a corresponding axial movement of the axle shaft 66, for example, along the axis 102.

The proximal end 154 of the axle shaft 66 may be received within the bore 152 of the second gear 146 at an axial depth d3. At the distal end 192 of the axle shaft 66, the outer spline arrangement 196 of the axle flange 190 may be disposed out of meshed engagement with the inner spline arrangement 202 of the cap 56. Also when in the engaged configuration, the boss 194 may be received within the recess 200 at an axial depth d4.

In the disengaged configuration, the axle shaft 66 may not transmit torque to the wheel hub 54 and cap 56. In this way, a torque may not be transmitted to a tire at the wheel hub 54.

Also when in the disengaged configuration, the first face spline arrangement 186 of the clutch collar 170 may be moved into engagement with a second face spline arrangement 188 on the second case portion 142. In this way, the differential assembly 64 may be in a locked configuration when the axle shaft 66 is in the disengaged configuration.

In at least one approach, the actuator 174 may be adapted to axially displace the shift fork 172, and thereby the axle shaft 66, a predetermined distance L. The predetermined distance L may define an axial distance between the first and second positions of the clutch collar 170. The predetermined distance L may be, for example, in the range of approximately 10 millimeters to approximately 20 millimeters, and more particularly, in the range of approximately 15 millimeters.

The predetermined distance L may be equal to d2 minus d4. In at least one approach, L<d2 (and d4>0). As such, even in the disengaged configuration, the recess 200 may support the distal end 192 of the axle shaft 66 via the boss 194, as shown in FIG. 14.

Also in at least one approach, d1+d2=d3+d4. In this way, a decrease of the depth of the boss 194 within the recess 200 may correspond to a proportional increase in the depth of the proximal end 154 of the axle shaft 66 within the bore 152 of the second gear 146.

In at least another approach, a spline arrangement may be disposed at the distal end 192 of the axle shaft 66 such that the axle shaft 66 may be rotatably fixed to the cap 56 when the axle shaft 66 is in both the first axial position and the second axial position. A selectively engageable clutch engagement may be provided at or proximate the proximal end 154 of the axle shaft 66. For example, a clutch engagement interface (such as an inner and outer spline arrangement or face spline arrangement) may be provided between the axle shaft 66 and the second gear 146. In this approach, the actuation mechanism 168 may selectively couple and decouple the axle shaft 66 with the second gear 146 at or proximate the proximal end 154 of the axle shaft 66.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drive axle assembly comprising:
    a differential assembly including a side gear;
    a wheel hub assembly including a hub and a cap;
    an axle shaft that is rotatable about an axis and extends axially from the differential assembly toward the cap such that the axle shaft is received in the hub, the axle shaft being moveable along the axis relative to the side gear and the cap; and
    an actuator mechanism that is configured to actuate the axle shaft along the axis between a first axial position in which the differential assembly provides torque to the wheel hub assembly and a second axial position in which the wheel hub assembly is disconnected from the differential assembly such that the differential assembly does not provide torque to the wheel hub assembly.

2. The drive axle assembly of claim 1 wherein the axle shaft has an axle flange that operatively connects the differential assembly to the wheel hub assembly when the axle shaft is in the first axial position.

3. The drive axle assembly of claim 2 wherein the axle flange is received in the hub.

4. The drive axle assembly of claim 3 wherein the cap is fixedly disposed on the hub.

5. The drive axle assembly of claim 4 wherein the axle flange engages the cap when the axle shaft is in the first axial position and is spaced apart from the cap when the axle shaft is in the second axial position.

6. A drive axle assembly comprising:
    a differential assembly including a side gear;
    a wheel hub assembly including a cap that defines a first clutch interface;
    an axle shaft that is rotatable about an axis and extends axially between the differential assembly and the wheel hub assembly, wherein the axle shaft is moveable along the axis relative to the side gear and includes a second clutch interface at a distal end; and
    an actuator mechanism that has a clutch collar that is secured to the axle shaft, the clutch collar being configured to move the axle shaft between a first axial position in which the second clutch interface is engaged with the first clutch interface, and a second axial position in which the second clutch interface is disengaged from the first clutch interface.

7. The drive axle assembly of claim 6 wherein the axle shaft is rotatably fixed to the side gear.

8. The drive axle assembly of claim 6 wherein the axle shaft provides torque to the wheel hub assembly when the axle shaft is in the first axial position, and the axle shaft does not provide torque to the wheel hub assembly when the axle shaft is in the second axial position.

9. The drive axle assembly of claim 6 wherein the side gear has a bore and the axle shaft has a proximal end disposed opposite the distal end, and the proximal end extends a first axial depth into the bore when the axle shaft is in the first axial position and the proximal end extends a second axial depth into the bore when the axle shaft is in the second axial position, wherein the second axial depth is greater than the first axial depth.

10. The drive axle assembly of claim 6 wherein the differential assembly includes a case that has a third clutch interface, the clutch collar has a fourth clutch interface, and the third clutch interface engages the fourth clutch interface when the axle shaft is in the second axial position to lock the differential assembly.

11. The drive axle assembly of claim 6 wherein the axle shaft includes a boss at the distal end, the cap defines a recess that receives the boss, and the boss is axially moveable within the recess.

12. The drive axle assembly of claim 6 wherein the cap includes a boss, the axle shaft has a recess at the distal end that receives the boss, and the recess is axially moveable relative to the boss.

13. The drive axle assembly of claim 6 wherein the first clutch interface includes a set of teeth that are arranged around the axis and the second clutch interface includes a set of teeth that are arranged around the axis and around an axle flange of the axle shaft.

14. The drive axle assembly of claim 13 wherein the set of teeth of the first clutch interface are disposed in the cap and extend toward the axis such that the axle flange is receivable in the first clutch interface and the set of teeth of the second clutch interface extends away from the axis and faces toward the first clutch interface.

15. The drive axle assembly of claim 13 wherein the set of teeth of the first clutch interface extend axially and face toward the axle flange and the set of teeth of the second clutch interface extend axially and face away from the differential assembly.

16. The drive axle assembly of claim 6 wherein the clutch collar includes clamp screws adapted to provide a compression force on the axle shaft to inhibit axial movement of the axle shaft relative to the clutch collar and the actuator mechanism is disposed proximate the differential assembly.

17. A method of operating a drive axle assembly comprising:
providing a differential assembly, a wheel hub assembly having a hub, and an axle shaft that is rotatable about an axis and extends axially from the differential assembly and is received in the hub; and
actuating the axle shaft along the axis between a first axial position between in which the differential assembly provides torque to the wheel hub assembly and a second axial position in which the wheel hub assembly is disconnected from the differential assembly such that the differential assembly does not provide torque to the wheel hub assembly.

18. The method of claim 17 wherein the wheel hub assembly has a first clutch interface, the axle shaft has a second clutch interface, and the first clutch interface mates with the second clutch interface when the axle shaft is in the first axial position.

19. The method of claim 18 wherein the wheel hub assembly has a cap that is fixedly disposed on an end the hub, wherein the axle shaft is coupled to the cap when the axle shaft is in the first axial position and is decoupled from the cap when in the second axial position.

20. The method of claim 18 wherein the differential assembly includes a case that has a third clutch interface, an actuation mechanism has a fourth clutch interface, and the third clutch interface engages the fourth clutch interface when the axle shaft is in the second axial position to lock the differential assembly.

* * * * *